US009937599B1

(12) United States Patent
Holleman et al.

(10) Patent No.: US 9,937,599 B1
(45) Date of Patent: Apr. 10, 2018

(54) DEBRIS COLLECTION FOR A MILLING PROCESS

(71) Applicant: The Boeing Company, Chicago, IL (US)

(72) Inventors: Wesley E. Holleman, Long Beach, CA (US); Nicholas Ryan Farrell, Long Beach, CA (US); Gary Lipczynski, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/288,883

(22) Filed: Oct. 7, 2016

(51) Int. Cl.
*B23Q 11/00* (2006.01)
*B23C 3/00* (2006.01)
*B23C 9/00* (2006.01)

(52) U.S. Cl.
CPC ............ *B23Q 11/0046* (2013.01); *B23C 3/00* (2013.01); *B23C 9/005* (2013.01); *B23B 2251/68* (2013.01); *B23C 2215/04* (2013.01); *B23C 2230/045* (2013.01); *B23C 2230/08* (2013.01); *B23C 2270/18* (2013.01)

(58) Field of Classification Search
CPC .......... B23Q 11/0046; B23C 2230/045; B23C 2230/08; B23B 2251/68
See application file for complete search history.

(56) References Cited

U.S. PATENT DOCUMENTS

| 3,738,765 A * | 6/1973 | Mater ...................... B23B 41/02 |
| | | 175/215 |
| 4,711,609 A * | 12/1987 | Seefluth .............. B23B 51/0413 |
| | | 175/213 |
| 4,966,503 A * | 10/1990 | Davidson ................ B23B 51/06 |
| | | 408/207 |
| 5,452,628 A | 9/1995 | Montgomery et al. |
| 6,123,489 A * | 9/2000 | Reccius ................ B23B 51/009 |
| | | 408/144 |
| 8,622,661 B2 * | 1/2014 | Inamasu ................... B23C 5/10 |
| | | 407/11 |
| 9,555,480 B2 * | 1/2017 | DeLand .................. B23B 35/00 |

(Continued)

FOREIGN PATENT DOCUMENTS

| DE | 10305991 A1 * | 12/2004 | ............... B23B 5/28 |
| JP | 08257815 A * | 10/1996 | |
| JP | 2002283176 A * | 10/2002 | |

(Continued)

OTHER PUBLICATIONS

Proquest machine translation of JP 08-257815, printed Aug. 2017.*
Proquest machine translation of JP 2002-283176, printed Aug. 2017.*

*Primary Examiner* — Daniel Howell
(74) *Attorney, Agent, or Firm* — Duft Bornsen & Fettig LLP

(57) ABSTRACT

A debris removal apparatus for a milling machine. In one embodiment, the debris removal apparatus includes a hollow, cylindrical suction member that attaches to a tool shaft which holds an end mill to rotate with the tool shaft. The debris removal apparatus further includes a nonrotating canister that applies a suction force to the suction member. The suction member is dimensioned to fit within a hole being cut by the end mill as the end mill is fed into the hole, and to extract debris created by the end mill via the suction force.

20 Claims, 5 Drawing Sheets

(56) References Cited

U.S. PATENT DOCUMENTS 9,573,201 B2 * 2/2017 Best .................. B23B 51/06
2013/0209190 A1 * 8/2013 Oode .................. B23C 9/00
                                                                                                        409/137

FOREIGN PATENT DOCUMENTS

| JP | 2002283177 | A | * | 10/2002 |
| JP | 2005118935 | A | * | 5/2005 |
| JP | 2006130616 | A | * | 5/2006 |
| JP | 2008178941 | A | * | 8/2008 |

* cited by examiner

US 9,937,599 B1

DEBRIS COLLECTION FOR A MILLING PROCESS

FIELD

This disclosure relates to the field of milling machines used in milling processes.

BACKGROUND

The fabrication of objects, such as aircraft, sometimes requires milling holes, recesses, pockets, etc., into a workpiece, such as a sheet of aluminum, titanium, stainless steel, composite materials, etc. The requirements of high-quality holes may be increased in applications such as aerospace. Typical hole requirements are related to dimension and damage. Dimension requirements include hole diameter, depth of the hole, diameter/angle of countersinks, roundness, etc. Damage requirements include burr height, surface finish, and delamination (such as for composite materials). The debris created in a milling process may affect the amount of damage to the hole being milled. Therefore, it is advantageous to extract most if not all of the debris as the hole is being milled to preserve the quality of the hole.

SUMMARY

Embodiments described herein include a debris removal apparatus for milling machines. A typical milling machine includes a rotary spindle that holds a cutting tool, and rotates the cutting tool for a cutting operation. The cutting tool includes a tool shaft and a removable end mill. A debris removal apparatus as described herein includes a cylindrical suction member that is attached to the tool shaft. An intake aperture of the suction member is positioned near the end mill to draw debris created by the end mill when cutting. An outlet aperture of the suction member delivers the debris to a nonrotating canister. Due to the attachment of the suction member and the tool shaft, the suction member follows the tool shaft down a hole when the end mill is cutting within the hole. Thus, the amount of suction proximate to the end mill remains constant regardless of the depth of the hole, and the suction member can effectively extract the debris from the hole. This advantageously provides a hole that is substantially free of debris during a milling process, which may decrease the amount of damage to the hole.

One embodiment comprises a debris removal apparatus that includes a hollow, cylindrical suction member that attaches to a tool shaft which holds an end mill to rotate with the tool shaft, and a nonrotating canister that applies a suction force to the suction member. The suction member is dimensioned to fit within a hole being cut by the end mill as the end mill is fed into the hole, and to extract debris created by the end mill via the suction force.

In another embodiment, the suction member includes a first end proximal to the end mill, and includes a second end distal from the end mill. The suction member includes at least one intake aperture on the first end that draws the debris into an interior of the suction member.

In another embodiment, the suction member includes at least one additional intake aperture along a side of the suction member proximal to the first end.

In another embodiment, the suction member includes at least one outlet aperture along the side of the suction member proximal to the second end. The nonrotating canister encloses a portion of the suction member that includes the at least one outlet aperture to apply the suction force to the suction member.

In another embodiment, an area of the at least one intake aperture is smaller than an area of the at least one outlet aperture.

In another embodiment, the suction member comprises a suction tube, a first connecting collar that attaches one end of the suction tube to the tool shaft proximal to the end mill, and a second connecting collar that attaches another end of the suction tube to the tool shaft distal from the end mill. The first connecting collar includes the at least one intake aperture.

In another embodiment, the nonrotating canister includes an enclosure, a first circular opening in the enclosure for the suction member to pass through, a first rotary coupling for the first circular opening to allow the suction member to rotate within the first circular opening, and a suction port in the enclosure for attaching to a suction device that creates the suction force.

In another embodiment, the nonrotating canister further includes a second circular opening in the enclosure coaxial with the first circular opening for the tool shaft to pass through, and a second rotary coupling for the second circular opening to allow the tool shaft to rotate within the second circular opening.

In another embodiment, an outer diameter of the suction member is less than a cutting diameter of the end mill.

Another embodiment comprises a debris removal apparatus that includes a suction member comprising a hollow cylinder that slides over a tool shaft which holds an end mill, and attaches to the tool shaft to rotate with the tool shaft. The suction member includes a first end proximal to the end mill, and includes a second end distal from the end mill. The debris removal apparatus further includes a nonrotating canister that encloses a volume around a portion of the suction member proximate to the second end. The nonrotating canister includes an enclosure, a first circular opening in the enclosure for the suction member to pass through, a first rotary coupling for the first circular opening to allow the suction member to rotate within the first circular opening, and a suction port in the enclosure that attaches to a suction device. The first end of the suction member includes at least one intake aperture to draw debris created by the end mill into a clearance between an outer diameter of the tool shaft and an inner diameter of the suction member. The second end of the suction member includes at least one outlet aperture to expel the debris from the clearance and into the nonrotating canister.

In another embodiment, the suction member further includes at least one additional intake aperture along a side of the suction member proximal to the first end.

In another embodiment, an area of the at least one intake aperture is smaller than an area of the at least one outlet aperture.

In another embodiment, the nonrotating canister further includes a second circular opening in the enclosure coaxial with the first circular opening for the tool shaft to pass through, and a second rotary coupling for the second circular opening to allow the tool shaft to rotate within the second circular opening.

In another embodiment, an outer diameter of the suction member is less than a cutting diameter of the end mill.

In another embodiment, the suction member comprises a suction tube, a first connecting collar that attaches one end of the suction tube to the tool shaft proximal to the end mill, and a second connecting collar that attaches another end of the suction tube to the tool shaft distal from the end mill. The first connecting collar includes the at least one intake aperture.

Another embodiment comprises a milling machine that includes a drive mechanism, a spindle driven at a first end by the drive mechanism to rotate about an axis, and a cutting tool gripped by a second end of the spindle, where the cutting tool includes a tool shaft and a removable end mill. The milling machine further includes a debris removal apparatus comprising a hollow, cylindrical suction member that attaches to the tool shaft to rotate with the tool shaft, and a nonrotating canister that applies a suction force to the suction member. The suction member is dimensioned to fit within a hole being cut by the end mill as the end mill is fed into the hole, and to extract debris created by the end mill via the suction force.

In another embodiment, the suction member includes a first end proximal to the end mill, and includes a second end distal from the end mill. The suction member includes at least one intake aperture on the first end that draws the debris into an interior of the suction member.

In another embodiment, the suction member includes at least one additional intake aperture along a side of the suction member proximal to the first end.

In another embodiment, the suction member includes at least one outlet aperture along the side of the suction member proximal to the second end; and the nonrotating canister encloses a portion of the suction member that includes the at least one outlet aperture to apply the suction force to the suction member.

In another embodiment, the nonrotating canister includes an enclosure, a first circular opening in the enclosure for the suction member to pass through, a first rotary coupling for the first circular opening to allow the suction member to rotate within the first circular opening, a second circular opening in the enclosure coaxial with the first circular opening for the tool shaft to pass through, a second rotary coupling for the second circular opening to allow the tool shaft to rotate within the second circular opening, and a suction port in the enclosure for attaching to a suction device that creates the suction force.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
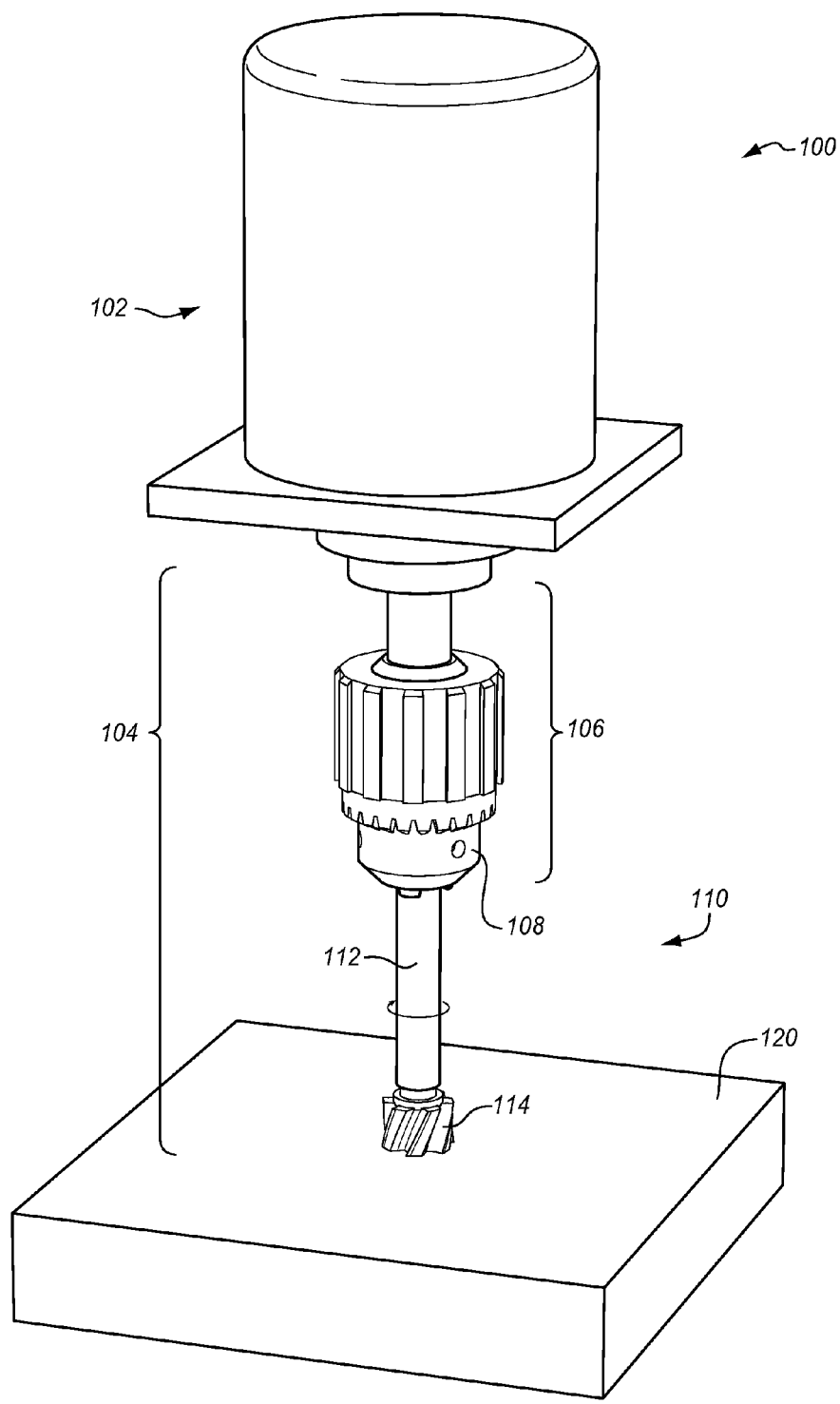
FIG. 1 illustrates a milling machine.

FIG. 1 illustrates a milling machine 100. Milling machine 100 uses a rotary cutting tool to remove material from a workpiece 120. Workpiece 120 may be a flat or curved sheet of material, such as titanium, aluminum, stainless steel, composite materials (e.g., Carbon Fiber Reinforced Polymer (CFRP), Carbon Fiber Reinforced Plastic (CRP), Carbon Fiber Reinforced Thermoplastic (CFRTP), etc.), or another type of material. Workpiece 120 may represent a part of an aircraft, an automobile, a watercraft, or some other machine being fabricated or assembled. Milling machine 100 may produce a hole, recess, pocket, etc., in workpiece 120, may be used for trim routing, or may be used for other milling processes. One example of a milling process is orbital or helical milling. Orbital milling is based on rotating a cutting tool around its own axis and simultaneously around a center axis that is offset from the axis of the cutting tool. By adjusting the offset, the diameter of the milled hole can likewise be adjusted.

Milling machine 100 includes a motor or drive mechanism 102 and a rotating mechanism 104. Rotating mechanism 104 includes an arbor or spindle 106, which is a vertical shaft that is driven at one end by drive mechanism 102 to rotate about an axis. Spindle 106 includes a chuck or fitting 108 at its other end for receiving and holding/gripping a cutting tool 110. Cutting tool 110 includes a tool shaft 112 and a removable end mill 114. Tool shaft 112 is gripped at one end by fitting 108, and end mill 114 is inserted into the other end of tool shaft 112. End mill 114 includes cutting edges (e.g., flutes or teeth) for removing material from workpiece 120. End mill 114 may have any desired shape, teeth, cutting angles, etc., for an applicable milling operation. The end of tool shaft 112, where end mill 114 is inserted, may include an offset mechanism for an orbital milling process.

Figure 2:
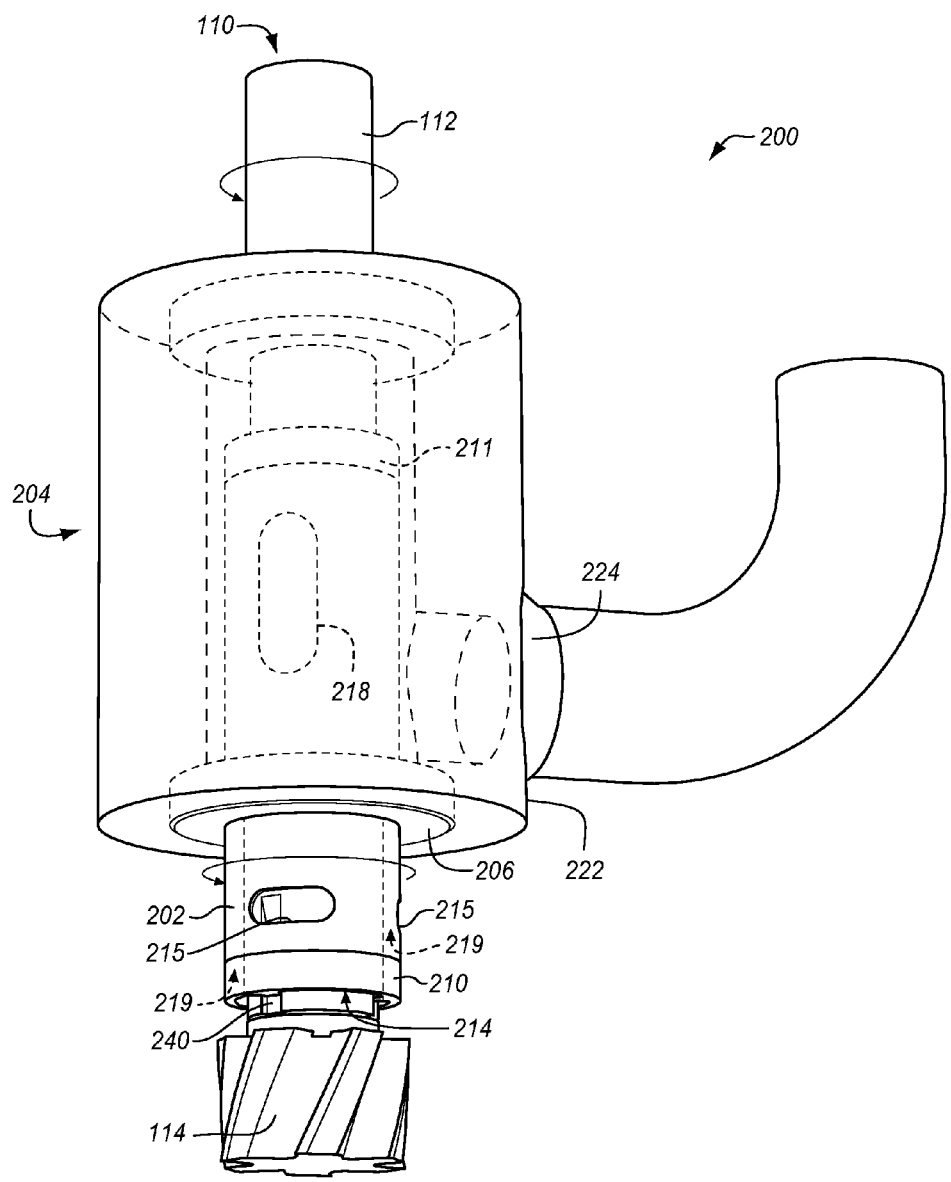
FIG. 2 illustrates a debris removal apparatus in an exemplary embodiment.

During a milling operation, end mill 114 shaves off chips, swarf, or waste material from workpiece 120, which is generally referred to herein as debris. The embodiments described here provide for removal of the debris created during a milling operation, such as with milling machine 100 or other types of milling machines. FIG. 2 illustrates a debris removal apparatus 200 in an exemplary embodiment. Debris removal apparatus 200 is illustrated as being installed over tool shaft 112 in this embodiment. Debris removal apparatus 200 includes a suction member 202 and a canister 204. Suction member 202 is a portion of debris removal apparatus 200 that rotates with the tool shaft/end mill of a milling machine, and draws debris created by the end mill. Suction member 202 attaches to tool shaft 112 so that it rotates along with tool shaft 112. For example, tool shaft 112 may include one or more longitudinal grooves 240, and suction member 202 may engage with grooves 240 to rotate along with tool shaft 112.

When attached to tool shaft 112, suction member 202 acts as a conduit for drawing debris via a suction force, and conveying the debris to canister 204. Suction member 202 is dimensioned to fit within a hole being cut by end mill 114, and to extract debris created by end mill 114 via the suction force.

Canister 204 is a stationary member of debris removal apparatus 200, which means that it does not rotate along with suction member 202. Canister 204 includes an enclosure 222 that partially encloses suction member 202. Canister 204 also includes a suction port 224 for connecting enclosure 222 to a suction device, such as a vacuum. The suction device creates a suction force within canister 204, and the suction force is translated to suction member 202 so that suction member 202 is able to draw debris created by end mill 114. Debris removal apparatus 200 also includes a rotary coupling 206 between enclosure 222 and suction member 202. Rotary coupling 206 allows suction member 202 to rotate while providing a substantially air-tight seal between canister 204 and suction member 202.

Figure 3:
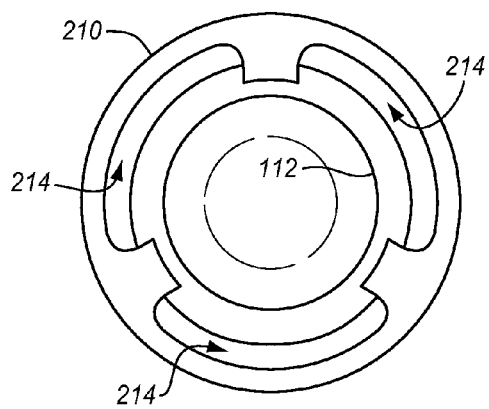
FIG. 3 illustrates an intake end of a suction member in an exemplary embodiment.

Suction member 202 is a hollow, cylindrical member that slides over tool shaft 112, and attaches to tool shaft 112 in a concentric manner. When attached to tool shaft 112, there is a clearance 219 or gap between the outer diameter (OD) of tool shaft 112 and the inner diameter (ID) of suction member 202, which provides a path for debris to flow in the interior of suction member 202 (i.e., a debris path). Suction member 202 includes an intake end 210 proximal to end mill 114. Suction member 202 also includes an outlet end 211 distal from end mill 114. Canister 204 encloses a volume around a portion of suction member 202 proximal to outlet end 211, and the other portion of suction member 202 is not enclosed by canister 204 and extends out an opening in canister 204 through rotary coupling 206. Intake end 210 of suction member 202 is outside of canister 204 and is in close proximity to end mill 114. Intake end 210 includes one or more intake apertures 214, which are openings in intake end 210 for drawing in the debris created by end mill 114 into an interior of suction member 202. FIG. 3 illustrates intake end 210 of suction member 202 in an exemplary embodiment. In this embodiment, intake end 210 includes a plurality of intake apertures 214 that are spaced radially about tool shaft 112. The length and width of intake apertures 214 may vary depending on the size of the debris created by end mill 114. In FIG. 2, suction member 202 may also include one or more additional intake apertures 215 along the side of suction member 202 proximal to intake end 210. Intake apertures 214-215 are positioned close to the location where the debris is created to maximize the chance of extracting the majority of the debris.

Outlet end 211 of suction member 202 is inside of canister 204. Suction member 202 includes one or more outlet apertures 218 along the side of suction member 202 proximal to outlet end 211. Outlet apertures 218 are openings in suction member 202 for expelling the debris that was drawn into the interior of suction member 202. Although the sizes of intake apertures 214-215 and outlet apertures 218 may vary based on the size of the debris created by end mill 114, the area of intake apertures 214-215 should be smaller than the area of outlet apertures 218 so that sufficient suction force is generated at intake apertures 214-215.

When a suction force is created within canister 204, air is drawn from intake apertures 214-215, through clearance 219, and out of outlet apertures 218 into the interior of canister 204. When debris is created by end mill 114, the suction force at intake apertures 214-215 is strong enough to draw the debris into intake apertures 214-215. The airflow then carries the debris through clearance 219 and out of outlet apertures 218 into the interior of canister 204. Therefore, the debris is removed from the hole being milled.

Figure 4:
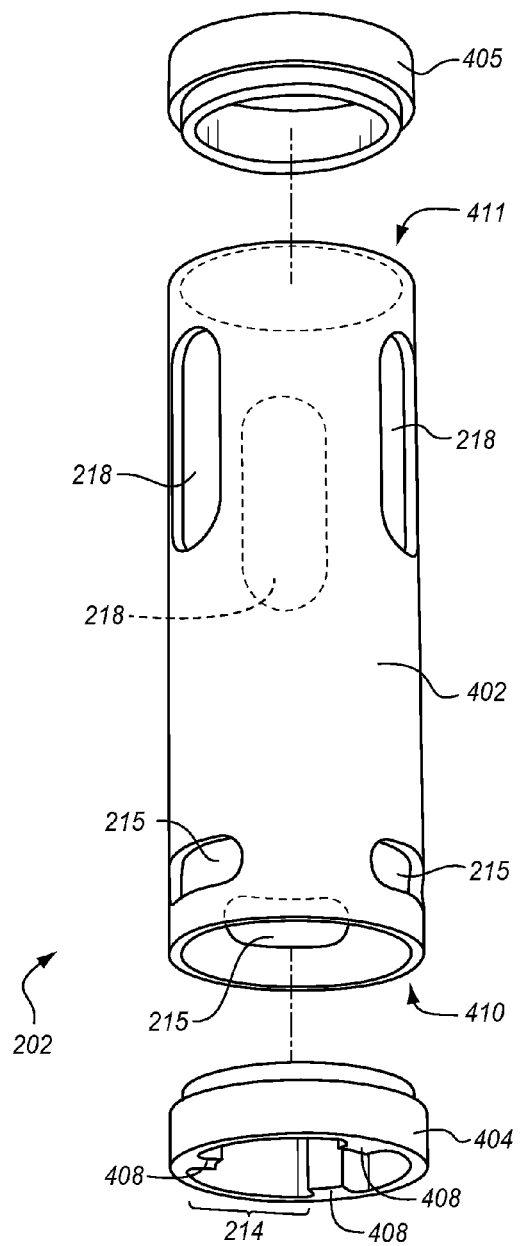
FIG. 4 illustrates a suction member in an exemplary embodiment.

FIG. 4 illustrates suction member 202 in an exemplary embodiment. In this embodiment, suction member 202 includes a suction tube 402 and connecting collars 404-405. Suction tube 402 is a hollow cylinder made from metal, plastic, etc. Connecting collars 404-405 are configured to attach suction tube 402 to a tool shaft of a milling machine. Connecting collar 405 is slid or pressed onto the tool shaft. Suction tube 402 is slid onto the tool shaft, and one end 411 of suction tube 402 is pressed onto connecting collar 405. Connecting collar 404 is slid or pressed onto the tool shaft, and onto the other end 410 of suction tube 402. Connecting collars 404-405 center suction tube 402 onto the tool shaft, and provide the clearance between the ID of suction tube 402 and the OD of the tool shaft. For example, connecting collar 404 includes a plurality of spacer tabs 408 that are spread out axially around an inner wall of connecting collar 404. Spacer tabs 408 attach suction tube 402 to the tool shaft, such as by engaging with a groove on tool shaft 112. Spacer tabs 408 also define the clearance 219 between the ID of suction tube 402 and the OD of the tool shaft. The gaps between spacer tabs 408 define the intake apertures 214 of suction member 202. The structure of suction member 202 shown in FIG. 4 is just one example, and other structures may be used.

Figure 5:
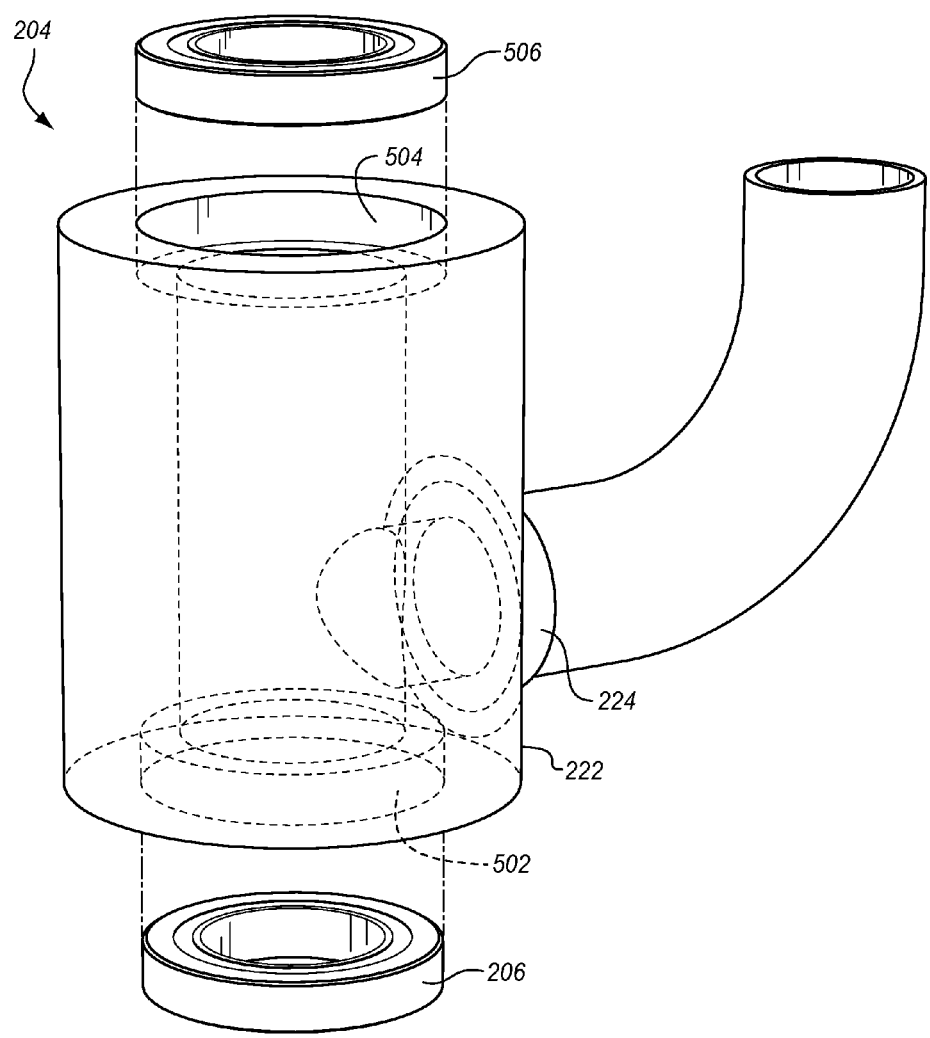
FIG. 5 illustrates a nonrotating canister in an exemplary embodiment.

FIG. 5 illustrates canister 204 in an exemplary embodiment. Canister 204 includes enclosure 222, which may be formed from a rigid material, such as aluminum, steel, plastic, etc. Enclosure 222 may alternatively be formed from an expandable material. Enclosure 222 may have a cylindrical profile as illustrated in FIG. 5, or may have any desired profile. Enclosure 222 includes a circular opening 502 at one end, and is dimensioned for suction member 202 to pass through. Rotary coupling 206 is attached to circular opening 502 to allow suction member 202 to rotate within circular opening 502 while providing an air-tight seal. Rotary coupling 206 may comprise an annular seal (e.g., rubber), a bearing, etc. Enclosure 222 includes another circular opening 504 coaxial with circular opening 502. In this embodiment, circular opening 504 is dimensioned for tool shaft 112 to pass through. A rotary coupling 506 is attached to circular opening 504 to allow tool shaft 112 to rotate within circular opening 504 while providing an air-tight seal. Enclosure 222 also includes suction port 224 along a side of enclosure 222. Suction port 224 provides an attachment point for a suction device that creates the suction force.

Figure 6:
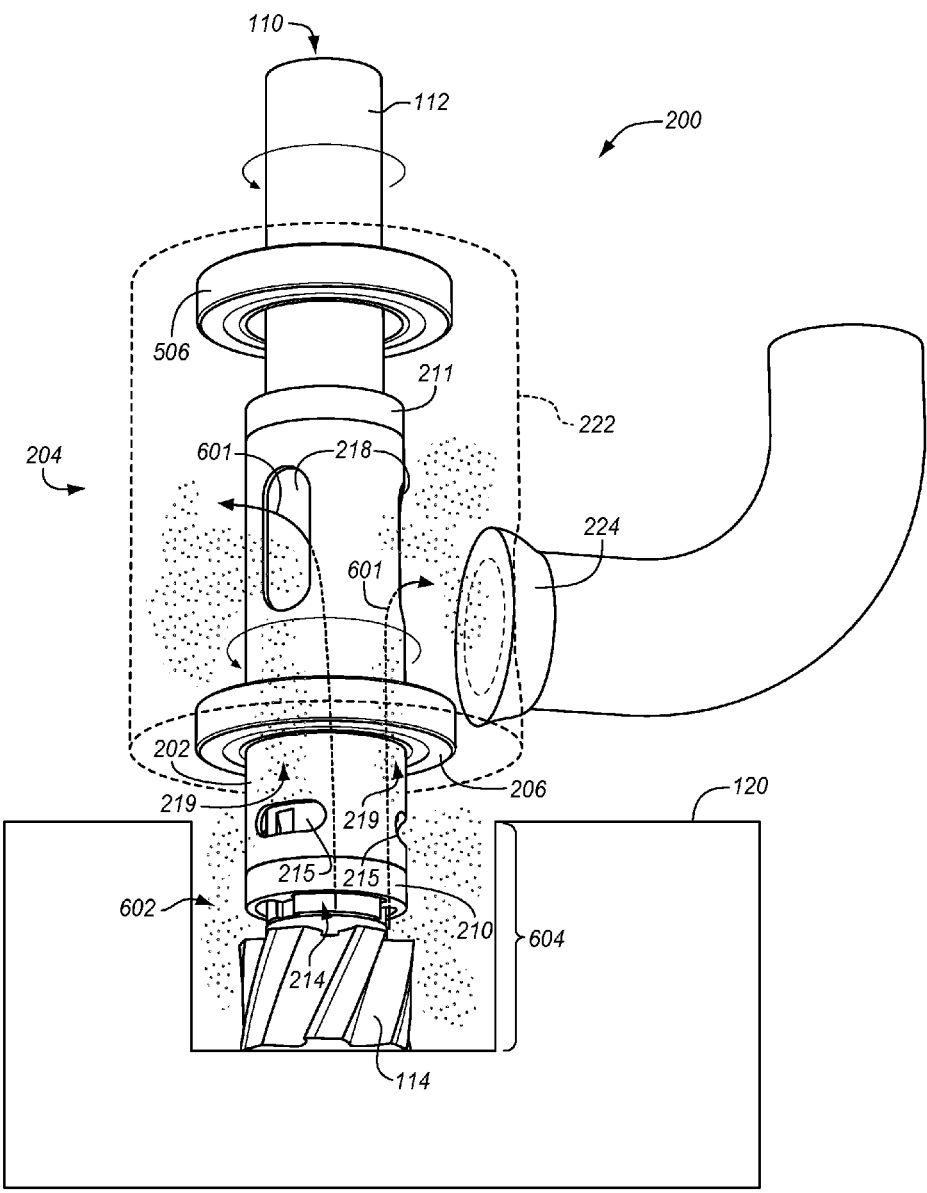
FIG. 6 illustrates a debris removal apparatus in operation in an exemplary embodiment.

FIG. 6 illustrates debris removal apparatus 200 in operation in an exemplary embodiment. In FIG. 6, a vacuum or other suction device is attached to suction port 224, and creates a suction force within canister 204. When a suction force is created within canister 204, an air flow 601 is drawn from intake apertures 214-215, through the clearance 219, and out of outlet apertures 218. As milling machine 100 rotates end mill 114 and feeds end mill 114 into workpiece 120, end mill 114 cuts workpiece 120 which creates debris 602. Intake apertures 214-215 are positioned close or proximate to end mill 114. Thus, the airflow 601 drawn into intake apertures 214-215 of suction member 202 is strong enough to draw the debris 602 into intake apertures 214-215. The airflow 601 then carries the debris 602 through the clearance 219 between the OD of tool shaft 112 and the ID of suction member 202, and out of outlet apertures 218 into the interior of canister 204. The debris 602 may collect within canister 204, or may be drawn out of suction port 224. Due to the close proximity of intake apertures 214-215 to end mill 114, the chance of extracting the majority of the debris 602 is maximized.

As end mill 114 is cutting in hole 604, suction member 202 follows end mill 114 into hole 604. Suction member 202 is attached to tool shaft 112 proximate to end mill 114 and rotates with tool shaft 112. Also, the OD of suction member 202 is less than the cutting diameter of end mill 114. Therefore, suction member 202 is able to be fed into hole 604 along with end mill 114. The result is that intake apertures 214-215 of suction member 202 maintain the same distance from end mill 114 as it is fed into hole 604. Because intake apertures 214-215 maintain the same distance from end mill 114 regardless of the depth of hole 604, the amount of suction force from intake apertures 214-215 proximate to end mill 114 remains constant (i.e., constant suction). This is advantageous as debris 602 may be effectively extracted when end mill 114 is cutting in "deep" holes, pockets, recesses, etc. (e.g., a deep hole has a depth at least four times its diameter). Also, the rotation of intake apertures 214-215 creates a low-pressure swirling effect above the debris 602 further increasing the chance that more debris 602 is extracted with the constant suction. Debris removal apparatus 200 is therefore able to extract a majority of the debris 602 resulting in a higher-quality hole 604.

Although specific embodiments were described herein, the scope is not limited to those specific embodiments. Rather, the scope is defined by the following claims and any equivalents thereof.

What is claimed is:

1. A debris removal apparatus comprising:
   a hollow, cylindrical suction member comprising a suction tube that attaches to a tool shaft to rotate with the tool shaft, wherein the suction tube attaches to the tool shaft by spacer tabs that define a clearance between the suction tube and the tool shaft; and
   a nonrotating canister that applies a suction force to the suction member;
   wherein the tool shaft holds an end mill;
   wherein the suction member is dimensioned to fit within a hole being cut by the end mill as the end mill is fed into the hole, and to extract debris created by the end mill via the suction force.

2. The debris removal apparatus of claim 1 wherein:
   the suction member includes a first end proximal to the end mill, and includes a second end distal from the end mill; and
   the suction member includes at least one intake aperture on the first end that draws the debris into an interior of the suction member.

3. The debris removal apparatus of claim 2 wherein:
   the suction member includes at least one additional intake aperture along a side of the suction member proximal to the first end.

4. The debris removal apparatus of claim 2 wherein:
   the suction member includes at least one outlet aperture along the side of the suction member proximal to the second end; and
   the nonrotating canister encloses a portion of the suction member that includes the at least one outlet aperture to apply the suction force to the suction member.

5. The debris removal apparatus of claim 4 wherein:
   an area of the at least one intake aperture is smaller than an area of the at least one outlet aperture.

6. The debris removal apparatus of claim 2 wherein:
   the suction member comprises:
   a first connecting collar that attaches one end of the suction tube to the tool shaft proximal to the end mill; and
   a second connecting collar that attaches another end of the suction tube to the tool shaft distal from the end mill;
   wherein the first connecting collar includes the at least one intake aperture.

7. The debris removal apparatus of claim 1 wherein:
   the nonrotating canister includes:
   an enclosure;
   a first circular opening in the enclosure for the suction member to pass through;
   a first rotary coupling for the first circular opening to allow the suction member to rotate within the first circular opening; and
   a suction port in the enclosure for attaching to a suction device that creates the suction force.

8. The debris removal apparatus of claim 7 wherein:
   the nonrotating canister further includes:
   a second circular opening in the enclosure coaxial with the first circular opening for the tool shaft to pass through; and
   a second rotary coupling for the second circular opening to allow the tool shaft to rotate within the second circular opening.

9. The debris removal apparatus of claim 1 wherein:
   an outer diameter of the suction member is less than a cutting diameter of the end mill.

10. A debris removal apparatus comprising:
    a suction member comprising a hollow cylindrical suction tube that slides over a tool shaft which holds an end mill, and attaches to the tool shaft to rotate with the tool shaft with spacer tabs that define a clearance between the suction tube and the tool shaft, wherein the suction member includes a first end proximal to the end mill, and includes a second end distal from the end mill;
    a nonrotating canister that encloses a volume around a portion of the suction member proximate to the second end, wherein the nonrotating canister includes:
    an enclosure;
    a first circular opening in the enclosure for the suction member to pass through;
    a first rotary coupling for the first circular opening to allow the suction member to rotate within the first circular opening; and
    a suction port in the enclosure that attaches to a suction device;
    wherein the first end of the suction member includes at least one intake aperture to draw debris created by the end mill into the clearance between an outer diameter of the tool shaft and an inner diameter of the suction tube;
    wherein the second end of the suction member includes at least one outlet aperture to expel the debris from the clearance and into the nonrotating canister.

11. The debris removal apparatus of claim 10 wherein:
    the suction member further includes at least one additional intake aperture along a side of the suction member proximal to the first end.

12. The debris removal apparatus of claim 10 wherein:
    an area of the at least one intake aperture is smaller than an area of the at least one outlet aperture.

13. The debris removal apparatus of claim 10 wherein:
    the nonrotating canister further includes:
    a second circular opening in the enclosure coaxial with the first circular opening for the tool shaft to pass through; and a second rotary coupling for the second circular opening to allow the tool shaft to rotate within the second circular opening.

14. The debris removal apparatus of claim 10 wherein:
an outer diameter of the suction member is less than a cutting diameter of the end mill.

15. The debris removal apparatus of claim 10 wherein:
the suction member comprises:
   a first connecting collar that attaches one end of the suction tube to the tool shaft proximal to the end mill; and
   a second connecting collar that attaches another end of the suction tube to the tool shaft distal from the end mill;
   wherein the first connecting collar includes the at least one intake aperture.

16. A milling machine comprising:
a drive mechanism;
a spindle driven at a first end by the drive mechanism to rotate about an axis;
a cutting tool gripped by a second end of the spindle, wherein the cutting tool includes a tool shaft and a removable end mill; and
a debris removal apparatus comprising:
   a suction member having a first end proximal to the end mill, and a second end distal from the end mill, the suction member comprising:
     a suction tube that is a hollow cylinder;
     a first connecting collar that attaches one end of the suction tube to the tool shaft proximal to the end mill; and
     a second connecting collar that attaches another end of the suction tube to the tool shaft distal from the end mill;
     wherein the first connecting collar includes spacer tabs that define a clearance between the suction tube and the tool shaft;
     wherein gaps between the spacer tabs define at least one intake aperture that draws debris created by the end mill into an interior of the suction member; and
   a nonrotating canister that applies a suction force to the suction member;
   wherein the suction member is dimensioned to fit within a hole being cut by the end mill as the end mill is fed into the hole, and to extract the debris created by the end mill via the suction force.

17. The milling machine of claim 16 wherein:
the suction member includes at least one outlet aperture along the side of the suction member proximal to the second end; and
the nonrotating canister encloses a portion of the suction member that includes the at least one outlet aperture to apply the suction force to the suction member.

18. The milling machine of claim 17 wherein:
the suction member includes at least one additional intake aperture along a side of the suction member proximal to the first end.

19. The milling machine of claim 17 wherein:
the clearance between the suction tube and the tool shaft provides a path for the debris to flow from the at least one intake aperture, through the interior of the suction member, and out the at least one outlet aperture into the nonrotating canister.

20. The milling machine of claim 16 wherein:
the nonrotating canister includes:
   an enclosure;
   a first circular opening in the enclosure for the suction member to pass through;
   a first rotary coupling for the first circular opening to allow the suction member to rotate within the first circular opening;
   a second circular opening in the enclosure coaxial with the first circular opening for the tool shaft to pass through;
   a second rotary coupling for the second circular opening to allow the tool shaft to rotate within the second circular opening; and
   a suction port in the enclosure for attaching to a suction device that creates the suction force.

\* \* \* \* \*